United States Patent [19]

Tengler

[11] Patent Number: 4,490,908
[45] Date of Patent: Jan. 1, 1985

[54] WIRE STRIPPER AND METHOD

[75] Inventor: John N. Tengler, Chardon, Ohio

[73] Assignee: Associated Enterprises, Inc., Painesville, Ohio

[21] Appl. No.: 634,660

[22] Filed: Jul. 26, 1984

Related U.S. Application Data

[63] Continuation of Ser. No. 366,922, Apr. 9, 1982, abandoned.

[51] Int. Cl.³ .............................................. H02G 1/12
[52] U.S. Cl. .................................. 30/90.4; 81/9.5 R; 29/426.1
[58] Field of Search ................. 81/9.5 R, 9.5 C, 9.51; 29/426.1, 403.1; 30/90.1, 90.6, 90.3, 90.2, 90.4

[56] References Cited

U.S. PATENT DOCUMENTS

| 2,120,398 | 6/1938 | Edwards et al. | 81/9.5 R |
| 2,347,956 | 5/1944 | Lansing | 81/9.5 R |
| 2,518,074 | 8/1950 | Sauter | 30/90.2 |
| 3,611,571 | 10/1971 | Belling | 81/9.5 C |
| 3,895,426 | 7/1975 | Papsdorf | 81/9.51 |
| 4,179,956 | 12/1979 | Gooley | 81/9.5 R |

FOREIGN PATENT DOCUMENTS

| 684287 | 11/1939 | Fed. Rep. of Germany | 81/9.51 |
| 1933065 | 1/1971 | Fed. Rep. of Germany | 81/9.5 |
| 2313125 | 9/1974 | Fed. Rep. of Germany | 81/9.5 R |
| 854696 | 1/1940 | France | 81/9.5 C |
| 607389 | 12/1978 | Switzerland | 30/90.4 |
| 1247967 | 9/1971 | United Kingdom | 81/9.5 R |

Primary Examiner—Roscoe V. Parker
Attorney, Agent, or Firm—Maky, Renner, Otto & Boisselle

[57] ABSTRACT

A wire stripper apparatus for stripping insulation from a coaxial type electric cable having a central conductor and a drain wire, which may be randomly located about the cable axis, includes piercing members to pierce through the cable insulation and pushing surfaces for pushing the drain wire out of the way of the piercing means so that during piercing and stripping of the cable insulation the drain wire is not damaged. The piercing members may be needle-like members having curved tips that pierce the cable insulation, on the one hand, and nudge, i.e. the pushing function, the drain wire out of the path of the penetrating needle-like members, on the other hand. The method is for stripping insulation of cable, especially of the aforesaid type, including such piercing and pushing steps.

33 Claims, 12 Drawing Figures

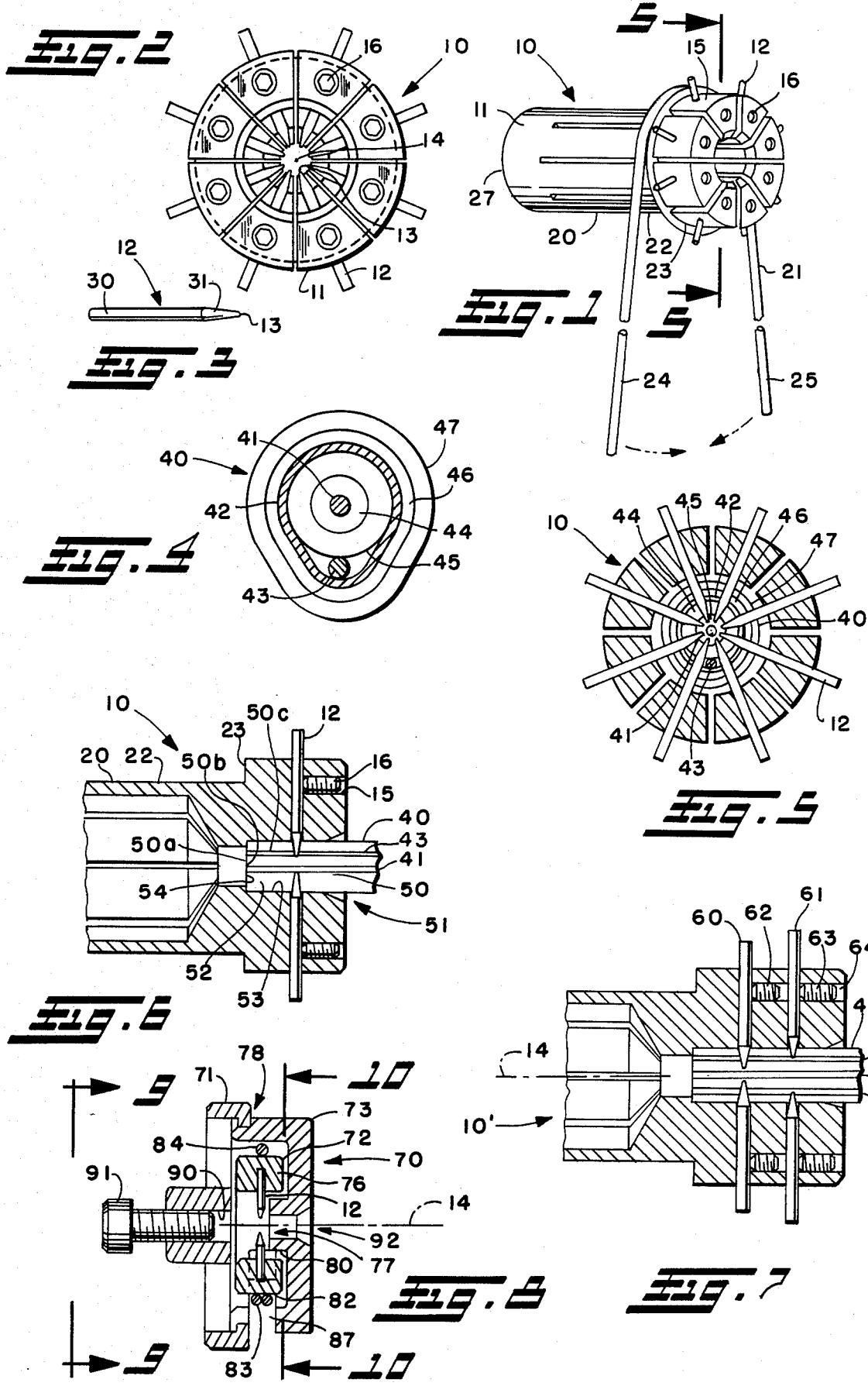

WIRE STRIPPER AND METHOD

CROSS-REFERENCE TO RELATED APPLICATION

This is a continuation of application Ser. No. 366,922 filed Apr. 9, 1982, now abandoned.

TECHNICAL FIELD

The present invention relates generally, as indicated, to wire strippers and a method for stripping insulation from an electric cable and, more particularly, to such a wire stripper and method for stripping insulation to expose the conductors of a coaxial type cable having a central or signal carrying conductor and a drain wire that is located randomly with respect to the cable axis.

BACKGROUND OF PRIOR ART

Coaxial cables frequently are used for various purposes including particularly the high speed transmission of electrical signals in computers. One such coaxial cable has a center conductor, a thin shield conductor, for example of foil, axially surrounding the center conductor, electrical insulation separating the center conductor and shield conductor, a drain wire engaged with the shield conductor and axially coextensive therewith, and an outer layer of electrical insulation. Since the shield conductor is rather thin and fragile, it is subject to breakage, discontinuities, and the like, and, accordingly, it is the purpose of the drain wire to maintain the electrical integrity of the shield conductor. Moreover, the drain wire may be located in the cable randomly with respect to the axis of the cable; for example, the drain wire may extend in a spiral-like manner about the cable axis and, of course, along the length of the cable.

To connect the center conductor and shield conductor/drain wire to other means, such as contacts that may be used to connect the same in electric circuits, it is necessary to expose the center conductor and the shield conductor/drain wire. For this purpose it is necessary to strip off at least some of the cable insulation at an end portion of the cable, which also requires stripping part of the shield conductor in order to gain access to the center conductor. Furthermore, it is desirable to effect connection of the shield conductor via the drain wire, but in the past it has not been possible conveniently to expose the drain wire beyond the shield conductor, especially due to the fact that the drain wire may be located generally randomly about the cable axis.

It would be desirable to be able to strip a coaxial cable, and particularly one including a drain wire, in a facile way that permits the center conductor and the drain wire to be coextensive and also that permits exposure of the drain wire beyond the relatively thin shield conductor without scathing the drain wire. The prior art wire strippers and methods have been unable to accomplish such functions.

BRIEF SUMMARY OF INVENTION

According to the invention an apparatus is provided for stripping the insulation from an electric cable, particularly one of the coaxial type having a center conductor, relatively thin shield conductor and a drain wire. More specifically, in accordance with the invention an apparatus and method are provided to enable in a facile manner the stripping of insulation from such a cable particularly to expose the center conductor and drain wire while leaving the drain wire at least substantially unscathed during the stripping process regardless of the position of the drain wire with respect to the cable axis.

Briefly, the fundamental features of the wire stripping apparatus include a piercing means for piercing the cable insulation, a support means for supporting the piercing means, and a pushing or nudging means for pushing one conductor, say the drain wire, of such cable away from the piercing means to prevent damage to such conductor during the piercing operation. In accordance with the method of the invention a cable having at least a first, say a center, conductor and a drain wire and insulation separating the same has insulation stripped therefrom by piercing the insulation using piercing means, pushing the drain wire out of the direct path of a leading portion of the piercing means, and separating one portion of the insulation from another portion thereof approximately at the area of the piercing by relative pulling motion between the cable and the piercing means.

With the foregoing in mind, a primary object of the present invention is to facilitate stripping cable, especially coaxial type cable.

Another object is to facilitate stripping insulation from a cable.

An additional object is to reduce damage to a cable conductor during stripping thereof.

A further object is to strip insulation from a coaxial type cable, especially of the type having a drain wire.

Still another object is to facilitate obtaining exposed access of the conductors of a coaxial type cable having a drain wire, especially without regard to the immediate circumferential location of such drain wire about the cable axis.

Still an additional object is to strip a coaxial cable having at least one drain wire without damaging the drain wire and preferably without damaging the other cable conductor(s).

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a perspective view of a wire stripper in accordance with the present invention;

FIG. 2 is a top plan view of the wire stripper;

FIG. 3 is an enlarged view of a needle-like piercing member;

FIG. 4 is a section view through a coaxial cable having a center conductor, shield conductor and drain wire;

FIG. 5 is a schematic section view of the wire stripper in operation to strip insulation from a coaxial cable of the type shown in FIG. 4 looking generally in the direction of arrows 5—5 of FIG. 1;

FIG. 6 is a partial section view of the wire stripper showing the cable stop and holding steps;

FIG. 7 is a side elevation section view of a modified wire stripper in accordance with the invention;

FIG. 8 is a side elevation section view of another modified wire stripper according to the invention;

DETAILED DESCRIPTION OF INVENTION

Figure 9:
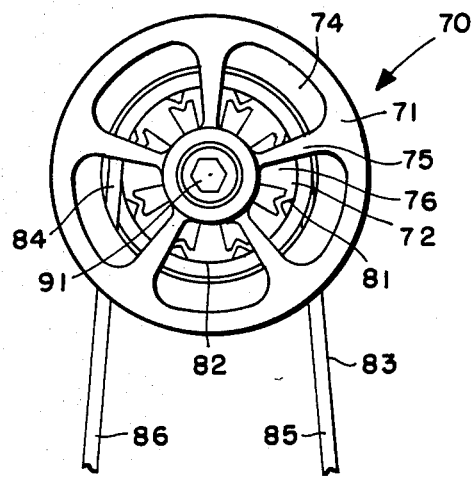
FIG. 9 is a left hand plan view of the wire stripper of FIG. 8.

Referring now in detail to the drawings, wherein like reference numerals designate like parts in the several figures, and initially to FIGS. 1 and 2, a wire stripper in accordance with the present invention is generally indicated at 10. The wire stripper 10 includes a support 11, a plurality of needle or pin-like piercing members 12 mounted on the support for movement toward and away from a cable inserted therebetween, and the ends 13 (FIG. 3) of the piercing members being curved in a manner that will cause the same to push or to nudge a drain wire in a coaxial type cable out of the direct path of the piercing means to prevent damage to such drain wire during piercing of the cable. The support 11 holds the piercing members 12 in a circular array or pattern directed radially toward the axial center 14 of the wire stripper 10 with the ends 13 most proximate the center. Preferably with the support 11 in the relaxed condition illustrated in FIG. 1 the ends 13 are equidistant from the axial center 14, and, therefore, would lie on the circumference of a common circle. To hold the piercing members 12, the support 11 has a plurality of radially oriented openings 15 therethrough; the piercing members 12 are positioned in such radial openings and are secured therein by set screws 16 that extend into the support 11. The proximity of the piercing member ends 13 with respect to the axial center 14 may be adjusted, as desired, to accommodate various size cables in the wire stripper 10 by loosening the set screws 16, moving the piercing members 12 to desired locations in the radial openings 15, and then tightening the set screws again.

The support 11 is in the form of a collet with individual support arms 20 that may be resiliently deformed by application of force thereto moving them from the relaxed condition shown in FIG. 1 toward the axial center 14 bringing the piercing members 12 toward the axial center to pierce the insulation of an electric cable inserted therebetween along the axial center 14. Such deforming force may be applied by a wire-like handle 21 having one or more full turns located around the cylindrical body 22 of the support 11. A shoulder 23 in the support 11 facilitates positioning of the handle 21 for optimum leverage. Moreover, the handle preferably is resilient so that upon application of a force tending to bring the handle arms 24, 25 together, the loop around the cylindrical body 22 is substantially uniformly reduced in diameter to move the support arms 20 and piercing members 12 toward the axial center 14 of the stripper 10. Releasing the handle arms 24, 25 causes them resiliently to separate enlarging the diameter of the handle loop and, thus, permitting the support arms 20 resiliently to move back to the relaxed relative positions shown in FIG. 1. The support arms are supported by a common ring or solid base 27 of the collet. The material of which the support 11 is made should be adequately strong and have desired resilient characteristics to permit deformation of the support arms 20 and resilient return thereof to the relaxed condition; such material preferably is metal but may also be plastic or other material.

A typical piercing member 12 is shown in FIG. 3. Such piercing member 12 is linear and includes a generally cylindrical body portion 30, a tapered or pointed head 31, for example of generally conical shape, and a leading end 13, which is curved, for example of partial spherical shape. The sharpness of taper of the head 31 and of the end 13 thereof should be adequate to enable facile piercing of the insulation of the cable intended to be stripped by the wire stripper 10. It also is expected that the head 31 and end 13 would pierce through the shield conductor, which may be of foil, for example, in order to continue piercing through the insulation layer(s) between such shield conductor and the center conductor of the cable. On the other hand, the curvature and bluntness of the end 13 should be adequate to cause the same upon piercing a cable with a drain wire to push, nudge, shove, or the like the drain wire out of the direct path of piercing by the piercing means 12 most preferably without scathing the drain wire. Moreover, the space between adjacent piercing members 12 should be adequate to permit the drain wire to be pushed and to pass therebetween as the respective piercing member ends 13 continue piercing through insulation material. The piercing members 12 should be adequately strong for the desired purposes described above, and they may be of metal, strong plastic, or other suitable material. According to the preferred embodiment and best mode of the invention, the piercing members may be conventional needles used in the playing of 78 rpm records.

Briefly referring to FIG. 4, a coaxial type cable of the type with which the wire stripper 10 may be used, is indicated at 40. The cable 40 has a center conductor 41, a shield conductor 42, a drain wire 43, multi-wrap inner insulation layers 44, an inner insulation jacket 45, several outer insulation layers 46, and an outer insulation jacket 47. In the illustrated cable 40 the shield conductor 42 preferably is a foil type electrically conductive material that is wrapped about the inner jacket 45 and is bonded thereto. Moreover, the actual location of the drain wire 43 may translate about the center conductor 41 generally in a spiral fashion along the axial length of the cable 40.

Turning now to FIGS. 5 and 6, operation of the wire stripper 10 to strip the cable 40 for exposing the center conductor 41 and drain wire 43 is illustrated. Specifically, the end portion 50 of a length of cable 40 is inserted into the entrance 51 of the wire stripper 10 and into the hollow interior 52 thereof generally along the axial center 14. A generally cylindrical recess 53 at the innermost end of the hollow interior 52 helps guide the cable 40 properly along the axial center 14 by confining the leading-most end portion 50a within the inner circumference of such cylindrical recess. Furthermore, an end stop surface 54 at the innermost end of the cylindrical recess 53 limits the maximum insertion depth of the cable end portion 50 into the wire stripper 10 so that when insulation is stripped, a prescribed length of the center conductor 41 and drain wire 43 is exposed, the length being approximately the distance between the plane in which the piercing members 12 are located and the plane of the end stop surface 54.

After the cable end portion 50 has been inserted to the position shown in FIG. 6, the wire-like handle 21 (FIG. 2) may be closed or tightened moving the respective support arms 20 and piercing members 12 inward toward the axial center 14. The piercing members 12 initially pierce or perforate the outer insulation layers 46 and outer insulation jacket 47. If the drain wire 43 is positioned between a pair of piercing members 12, such piercing members will pass by the drain wire in the manner shown in FIG. 5 as they continue moving radially toward the center conductor 41. However, if a side of the tapered head 31 of a piercing member were to abut the drain wire or if the curved leading end 13 of the piercing member were to strike the drain wire 43, either or both would gently push the drain wire out of the direct radial path of the particular piercing member ordinarily without damaging the drain wire. During piercing, too, the piercing members 12 would pierce the shield conductor 42, inner jacket 45, and multi-wrap inner insulation layers(s) 44.

Radial inward movement of the piercing members 12 and support arms 20, i.e. movement toward the axial center 14, may be limited or stopped by the walls of the cylindrical recess 53 coming into engagement with the leading-most end portion 50a of the cable 40 (FIG. 6). The positions of the piercing members 12 relative to the support arms 20 should be so adjusted in the openings 15 such that the center conductor 41 would not be damaged by the piercing members when at the maximum radial inward condition or position thereof as limited by the cooperation of cylindrical recess 53 and leading-most cable end portion 50a.

The walls of the cylindrical recess 53 grip the leading-most cable end portion 50a when the piercing members 12 have pierced substantially fully through the cable 40 up to the center conductor 41. Then relative pulling movement may be effected between the extent of the cable 40 outside the wire stripper 10 and the wire stripper itself. This axial movement causes the insulation material between the perforations made by each of the piercing members 12 to tear whereupon the insulation material as well as the shield conductor 42 covering the end portions 50b, 50c of the center conductor 41 and drain wire 43 are removed thereby exposing such end portions 50b, 50c for facile electrical connection thereof, for example, to contacts or other means not shown. The compressive force applied by the wire-like handle 21 to the cylindrical body 22 of the wire stripper support 11 may be released, whereupon the support arms 20 resiliently return to a relaxed condition expanding the wire stripper entrance 51 and allowing the stripped insulation and shield conductor portions within the hollow interior 52 of the wire stripper easily to be removed.

Briefly looking at FIG. 7, a modified wire stripper 10' is illustrated. The wire stripper 10' is similar to the wire stripper 10 described above. However, in the wire stripper 10' the piercing members 12 are arranged in the support arms 20 in two separate groups 60, 61 located in respective planes that are perpendicular to the central axis 14 and spaced apart from each other. The piercing members in the innermost group 60 are held in place by set screws 62 and function in the manner described above to strip the cable 40 fully exposing the drain wire and the center conductor. However, the piercing members 12 in the second group 61, which are held by set screws 63 in a common threaded opening 64 with set screws 62, do not protrude or extend radially toward the axial center 16 as far as the piercing members in the first group do. Therefore, the piercing members in the second group would not pierce as far as into the cable 40 as do the piercing members in the first group 60; more particularly, the piercing members in the second group 61 may only pierce up to the shield conductor 42 so that after a stripping operation that shield conductor is exposed over an axial length of the cable 40 approximately equal to the spacing between the two groups 60, 61 of piercing members 12. The multiple level or stage arrangement of piercing members used in the wire stripper 10' may be used with more than two layers, depending on the particular characteristics of the cable intended to be stripped by the wire stripper and/or the particular conductor portions, for example, of the cable being stripped intended for exposure.

Figure 10:
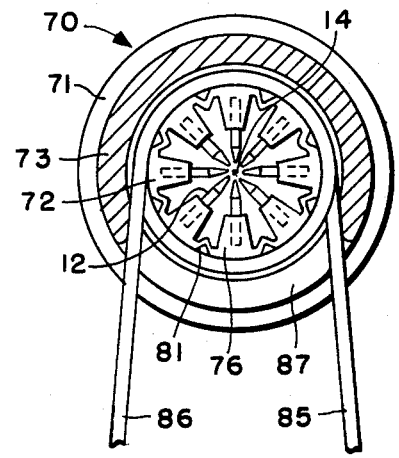
FIG. 10 is a section view of the wire stripper of FIG. 8 looking in the direction of arrows 10—10.

Referring now to FIGS. 8, 9 and 10, a modified wire stripper 70 in accordance with the present invention is shown. The wire stripper 70 embodies the various features described above but is of reduced axial length from the wire stripper 10, for example, due to the cooperative interrelation of the main support body 71, resilient collet-like support 72, and cover 73. The main support body 71 is generally of circular plan, as can be seen in FIG. 9, and has plural openings 74 of generally identical size and configuration and radial and circumferential orientation with respect to the axial center 14 of the wire stripper 70. The arms 75 separating the openings 74 provide sliding support surfaces for the collet-like support 72 particularly allowing the holder portions 76 thereof to move radially toward and away from the axial center 14. Each holder portion 76 of the collet-like support 72 has mounted therein at least one piercing member 12, described above in detail, that protrude into the stripping zone 77. Although not shown, radial adjustment of the type described above with reference to FIGS. 1 and 2, for example, may be provided to enable relative positioning of the piercing members 12 in the collet-like support 72.

The cover 73 may be of plastic or metal material preferably having a resilient characteristic allowing it to be snapped into a connection with overlapping tabs or flanges generally indicated at 78. Other types of connections, such as a screw type connection or the like, also may be provided to secure the cover 73 to the main support body 71 forming a housing enclosure for the collet-like support 72 and piercing members 12. An annular stop 80 about the interior of the cover 73 limits the radial inward movement of the collet-like support and resilient web portions 81, for example integral with the holder portions 76 and extending between respective adjacent pairs thereof, resiliently urge the holder portions 76 radially outward to relative first positions in the housing. However, with a radially directed or compressive type force applied to the outside wall 82 of respective holder portions 76, the same are urged radially inward toward the axial center 14 to effect the wire stripping function generally described above with reference to FIGS. 5 and 6. Such compressive force may be applied by closing the arms of a handle 83 of the looped wire-like type mentioned above with respect to FIG. 2. The center loop 84 of the handle may circumscribe the outer perimeter of the collet-like support 72 with the handle arms 85, 86 protruding out from a slot 87 in the housing cover 73. However, upon release of such radially inwardly directed force applied, for example, by the wire-like handle 83, the resilient nature of the web portions 81 cooperate with the holder portions 76 urging the same outward from the axial center 14 to enable removal of the stripped material from the stripping zone 77. In the central portion of the main support body 71 is a threaded opening 90 aligned with the insertion path of a cable into the wire stripper 70 and areawise large enough to receive a leading end of such cable. An adjustable screw stop 91 may be threaded in such opening 90 toward or away from the stripping zone 77 along the axial center 14 to adjust the actual length of the cable end portion 50 that would be capable of insertion into the wire stripper 70, and, accordingly, the length of material stripped from such cable and particularly the length of drain conductor and center conductor that will be exposed after stripping.

The wire stripper 70 may be used to strip insulation from a cable inserted via the housing entrance 92 into the stripping zone 77 generally in the manner described above with reference to FIGS. 5 and 6. Specifically, the leading ends 13 of the piercing members 12 and the surface of the tapered heads 31 would pierce the cable while tending to push the cable drain wire out of the direct path of the piercing member(s) to prevent damage to the drain wire 43.

Figure 11:
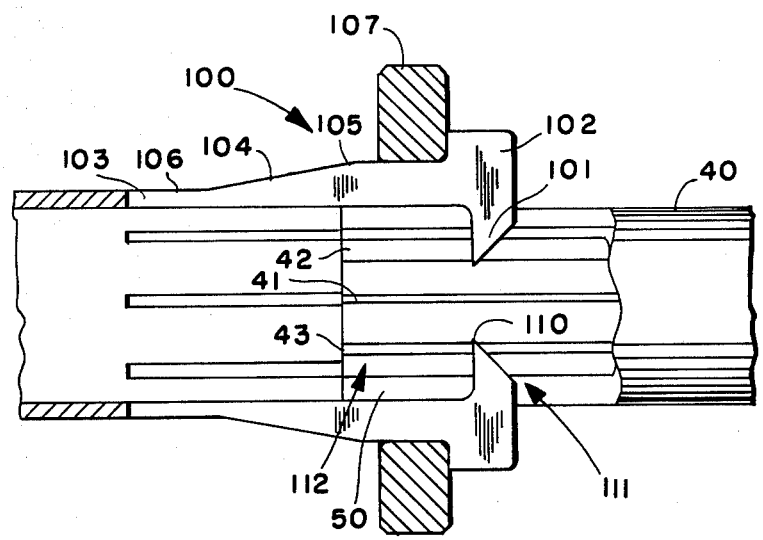
FIG. 11 is a partial section view of still another modified wire stripper according to the invention.

Referring briefly to FIG. 11, a modified wire stripper 100 is shown. The wire stripper 100 includes a plurality of piercing members 101 molded as part of and, therefore, integrally formed with the support arms 102 of an overall support generally designated 103, only a portion of which is shown, however, in FIG. 11. The support 103, including the piercing members 101, may be molded of relatively rigid plastic material, may be otherwise formed of plastic, metal or like material, etc. Essentially, however, the strength of the piercing members 101 must be adequate to pierce the cable 40 without damaging the piercing members. The wire stripper 100 is generally of cylindrical shape having an external cam-like surface 104 that is tapered from a relatively wide diameter zone 105 down to a narrower diameter zone 106. An annular collar 107 is slidable over the support 13 along the surface 104. When the collar is near the narrower diameter portion 106, the several support arms 102 are in a relaxed condition with the piercing members 101 relatively far apart from each other generally in the same arrangement as the piercing members shown in FIG. 1 of the wire stripper 10 described above. However, upon sliding the collar 107 to the right relative to the illustration of FIG. 11 and to the position shown in FIG. 11, such collar forces the larger diameter portions 105 of the support arms 102 toward the axial center 14 of the wire stripper 100 causing the piercing members 101 to pierce the cable 40 as shown. The leading ends 110 of the piercing members 101 preferably are curved or satisfactorily blunt to provide the desired pushing of the drain wire 43 in the manner described above without damaging the drain wire during the piercing and stripping process; yet, the leading ends 110 of the piercing members 101 are adequately sharp or pointed to pierce with facility through the cable insulation. The entrance 111 to the interior 112 of the wire stripper 100 is tapered in the manner illustrated to facilitate inserting the leading end portion 50 of the cable 40 into the wire stripper. A base portion (not shown) of the wire stripper 100 holds the several support arms 102 relative to each other generally in the manner of the bottom portion of the collet-like support 11 illustrated in FIG. 1, and in the interior of the wire stripper 100 may also be a stepped recess (not shown) of the type illustrated at 53 and described above with reference to FIG. 6.

Figure 12:
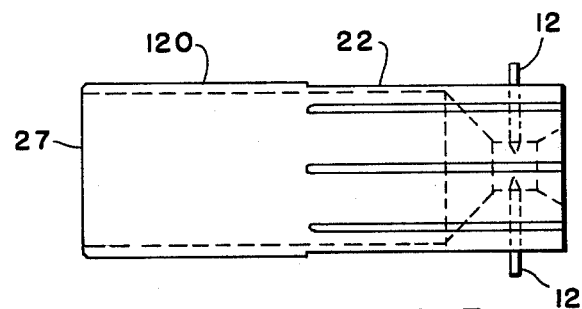
FIG. 12 is a side elevation view of a collet that may be used in the several embodiments of the invention shown in the other figures.

A collet 120 having a relatively thin annular thickness of the support arms 22 and an open base 27 is shown in FIG. 12 in a modified wire stripped 121. The thin collet 120 may be employed in the wire strippers 10, 10' and 110 described above.

STATEMENT OF INDUSTRIAL APPLICATION

In view of the foregoing it will be appreciated that the several embodiments of wire stripper in accordance with the present invention may be used to strip insulation from a coaxial type cable, especially of the type having a central conductor, a shield conductor, and a drain wire. It also will be appreciated that the invention may be used to strip other types of cables.

I claim:

1. A wire stripping apparatus for stripping insulation from a coaxial cable having an insulated centrally located conductor and a drain wire radially spaced from said central conductor and at a random circumferential location with respect thereto, said apparatus comprising a plurality of piercing means disposed in a radial array each having an innermost end portion for piercing the insulation around the central conductor, and means for moving said piercing means radially inward to pierce the insulation of the central conductor, each of said piercing means including surface means for moving the drain wire from a random circumferential location to a circumferential location between an adjacent pair of said piercing means during the radially inward movement of said piercing means.

2. A wire stripping apparatus for stripping insulation from a coaxial cable having an insulated centrally located conductor and a drain wire radially spaced from said central conductor and at a random circumferential location with respect thereto, said apparatus comprising a plurality of piercing means disposed in a radial array each having an innermost end portion for piercing the insulation around the central conductor, support means for supporting said piercing means, and means for moving said piercing means radially inward to pierce the insulation of the central conductor, each of said piercing means including surface means for moving the drain wire from a random circumferential location to a circumferential location between an adjacent pair of said piercing means during the radially inward movement of said piercing means, said support means comprising plural resiliently deformable support arms each having a respective step means facing other step means for engaging a part of a cable inserted into the wire stripper to limit the maximum radial inward deformation of said support arms and piercing means.

3. Stripping apparatus comprising a plurality of piercing means for piercing the insulation of a cable, each of said piercing means comprising a needle-like member, support means for supporting said piercing means, said support means comprising holding means for holding said plurality of needle-like members in first relative positions to receive a cable between said plurality of needle-like members, said support means being capable of resilient deformation to move said needle-like members toward and away from a cable inserted therebetween, pushing means for pushing a drain wire in the cable away from said needle-like members to prevent damage to such conductor during such piercing, said pushing means comprising curved leading ends of said needle-like members, and operating means for applying force to said support means to resiliently deform the latter to move said needle-like members toward each other to pierce such cable insulation and for releasing such force to permit resilient return of said support means to an undeformed condition, said operating means comprising a bent wire with a central loop for applying a force to said support means to urge said needle-like members toward one another to pierce such cable.

4. The apparatus of claim 3, said support means comprising a collet-like member.

5. The apparatus of claim 4, further comprising adjusting means for radially adjusting said needle-like members in said collet-like member.

6. The apparatus of claim 3, said support means comprising means for holding said piercing means in a generally circular pattern.

7. The apparatus of claim 6, said piercing means comprising elongate members, and said support means comprising means for holding said piercing means to extend generally in a radial direction with respect to such circular pattern and for simultaneous movement radially toward and away from the center of such circular pattern to pierce the insulation of a cable positioned approximately at such center and to withdraw therefrom.

8. The apparatus of claim 7, said piercing means comprising needle-like members and further comprising means for adjusting the radial position of said needle-like members in said support means.

9. The apparatus of claim 3, said piercing means comprising a record needle.

10. The apparatus of claim 7, further comprising means for limiting the maximum extent of insertion of a cable into the apparatus in a direction generally perpendicular to the usual direction of movement of said piercing means relative to such an inserted cable.

11. The apparatus of claim 3, a support means comprising a main support base and holder means for holding respective piercing means, and means for urging said holder means to one position.

12. The apparatus of claim 11, said support base being generally of circular configuration, said holder means being movable radially relative to said support base, and said operating means comprising means for applying force to move said holder means to bring said piercing means into engagement with a cable to pierce the same.

13. The apparatus of claims 11 or 12, further comprising cover means for confining said holder means between said cover means and said support base.

14. The apparatus of claims 11 or 12, further comprising said means for urging comprising coupling means for coupling said holder means to position the same in first relative positions when said coupling means is in one condition.

15. The apparatus of claim 14, said coupling means being resiliently deformable, and upon resilient deformation from such one condition being operative to apply force to said holder means urging the same to such first relative position.

16. The apparatus of claim 15, said coupling means comprising a web-like material between respective adjacent pairs of holder means.

17. The apparatus of claim 13, said cover means having an entrance for guiding a cable into the apparatus positioned to be pierced by said piercing means.

18. The apparatus of claim 17, said cover means further comprising a protruding stop-like member for limiting radial inward movement of said holder means.

19. The apparatus of claim 11, further comprising adjustable means for adjusting the depth of insertion of a cable into the wire stripper to control the length of insulation stripped from such cable.

20. The apparatus of claim 3, a support means comprising plural resiliently deformable support arms, each having a respective step means facing other step means for engaging and holding part of a cable in the wire stripped when said support arms are so resiliently deformed.

21. A method of stripping a coaxial cable having an insulated centrally located conductor and a drain wire radially spaced from said central conductor and at a random circumferential location with respect thereto, said method comprising the steps of positioning a plurality of piercing means disposed in a radial array around the cable randomly with respect to the circumferential position of the drain wire, moving the plurality of piercing means radially inward to pierce the insulation of the central conductor while pushing the drain wire from the random circumferential location to a circumferential location between an adjacent pair of piercing means, and tearing the insulation between adjacent pairs of piercing means by pulling said plurality of piercing means axially with respect to said cable thereby to separate one portion of the insulation from another portion of the insulation at the area of piercing.

22. The method of claim 21, such cable comprising a coaxial type cable, and further comprising stopping movement of such piercing means short of direct engagement with the central conductor of such cable.

23. The method of claim 21, said piercing comprising using curved tipped needle-like members, and said pushing comprising pushing with such curved tips.

24. The method of claim 23, such needle-like members comprising a plurality of the same, and further comprising adjusting the relative positions of such needle-like members.

25. The method of claim 21, said piercing comprising resiliently moving such piercing means toward and away from each other.

26. The method of claim 25, further comprising inserting such cable between such piercing means.

27. The method of claim 25, said separating comprising while such piercing means are closed in piercing such cable, effecting relative pulling motion between such cable and such piercing means.

28. The method of claim 21, wherein such cable comprises a coaxial cable with essential conductor and a drain wire, and said piercing comprising piercing through the insulation of such cable without piercing such central conductor.

29. The method of claim 21, such coaxial cable comprising a central conductor and a drain wire, and said piercing comprising piercing through such cable to such central conductor while pushing such drain wire out of the way of such piercing means.

30. The method of claims 28 or 29, further comprising leaving such drain wire unscathed.

31. The method of claims 28 or 29, further comprising leaving such central conductor unscathed.

32. The method of claim 30, further comprising inserting a cable between such piercing means and limiting the depth of insertion of such cable.

33. The method of claim 32, further comprising adjusting the permitted insertion length.

* * * * *